(12) United States Patent
Forbin

(10) Patent No.: US 6,837,365 B1
(45) Date of Patent: Jan. 4, 2005

(54) FORMABLE ARTICLE OF MANUFACTURE

(76) Inventor: Gregory J. Forbin, 5650 Miss Royal Pass, Loveland, OH (US) 45140

( * ) Notice: Subject to any disclaimer, the term of this patent is extended or adjusted under 35 U.S.C. 154(b) by 163 days.

(21) Appl. No.: 10/281,243

(22) Filed: Oct. 28, 2002

(51) Int. Cl.$^7$ ................................. B65G 21/20
(52) U.S. Cl. ..................... 198/836.1; 198/957
(58) Field of Search ............... 198/836.1, 957

(56) References Cited

U.S. PATENT DOCUMENTS 4,932,517 A    6/1990    Johnson
5,522,206 A    6/1996    Moncrief et al.
6,010,141 A    1/2000    Huntimer et al.
6,105,757 A    8/2000    Ledingham Primary Examiner—Douglas Hess
(74) Attorney, Agent, or Firm—Charles R. Wilson

(57) ABSTRACT

An article of manufacture has a thin elongated malleable metal core with a UHMW polyethylene cladding system. The metal core has holes extending from a substantially flat front face to a substantially the full back face and further a pattern of holes extend substantially the full length of the metal core. The holes are uniformly spaced to form a hole pattern dependent on the force stresses which will be encountered. The article of manufacturer is particularly suited as a guide rail or lane divider in a conveyor line guide structure, particularly to direct items along a travel path.

20 Claims, 6 Drawing Sheets

FORMABLE ARTICLE OF MANUFACTURE

FIELD OF THE INVENTION

This invention relates to an article of manufacture formable to structures useful in industry. More particularly, the invention relates to an article of manufacture formable to structures which require stress force resistance with a high wear and low friction surface such as used in a conveyor line.

BACKGROUND OF THE INVENTION

Articles of manufacture of all natures are used throughout industry. Conveyor lines in particular are prevalent. They are commonly used to transport items at different manufacturing stages from work station to work station. The lines often have a high speed continuous belt or a set of rollers on which the items are placed. Guide structures including guide rails or similarly constructed structures to confine the items within a narrow travel path are needed. The structures can be stationary or move with the conveyor line. In all instances they must be durable to withstand normally encountered shear forces. They also must have a high wear surface which provides little slide resistance to items that contact them. Often, they must be capable of being shaped to accommodate the factory's manufacturing or packaging lay-out, e.g. a curved travel path.

Guide structures which meet the above criteria are known and are acceptable. For example, a plastic facing sheet with low slide resistance can be attached to a metal strip having high strength. However, a separate step of attaching the two together is needed. Continual monitoring of the attachment is also needed. Guide structures are needed which are more reliable as well as more durable since any down time for repairs is costly. Guide structures are also needed which provide more versatility for use with variable-line travel path conveyor lines. While a straight line travel path for conveyor lines is most often desired, factory space and equipment layout simply does not always allow it. In such instances, the conveyor line must be curved as needed. However, known guide structures are difficult to bend without breaking or creating surface irregularities which increase slide resistance.

In accord with a need for improved guide structures in the conveyor line industry, there has now been developed guide structures which provide an advance in the industry. The guide structure of the invention are durable in that they can be used for extended runs without repair or replacement. They are readily formed to conform to a variable-line travel path without breaking or creating surface irregularities which could interfere with item movement. They also have a substantially friction free surface which allows the items to slide along without item damage or line jams.

SUMMARY OF THE INVENTION

An article of manufacture is primarily useful for forming into guide structures used to guide items along a conveyor line. The article of manufacture has a thin elongated malleable metal core with a spaced hole pattern and a cladding system over opposed faces of the metal core. The holes in the metal core extend substantially the full length of the metal core and extend from a substantially flat front face to an opposing substantially flat back face. The holes are substantially uniformly spaced in the metal core and form a hole pattern defined in part by the particular use contemplated for the article of manufacture. The metal core is strong, durable and capable of withstanding stress forces encountered in its use. The metal core further is formable to various shapes to enhance its field of use. The cladding system is a UHMW polyethylene covering both of the faces of the metal core and extending through the holes in the metal core to form an integral covering with desired surface physical characteristics.

DETAILED DESCRIPTION OF THE INVENTION

The article of manufacture of the invention is described below and with reference to the drawings. The article of manufacture is particularly useful as a guide structure used as part of a conveyor line. It should be understood the article of manufacture can be used elsewhere and such uses are contemplated herein. Particular examples of guide structures include guide rails, lane dividers, wear plates, wear strips, conveyor beds, chain guides and return rails. Common characteristics of the guide structures are that each structure must be capable of resisting stress forces and must have a high wear-resistant and low friction surface to function properly.

Figure 1:
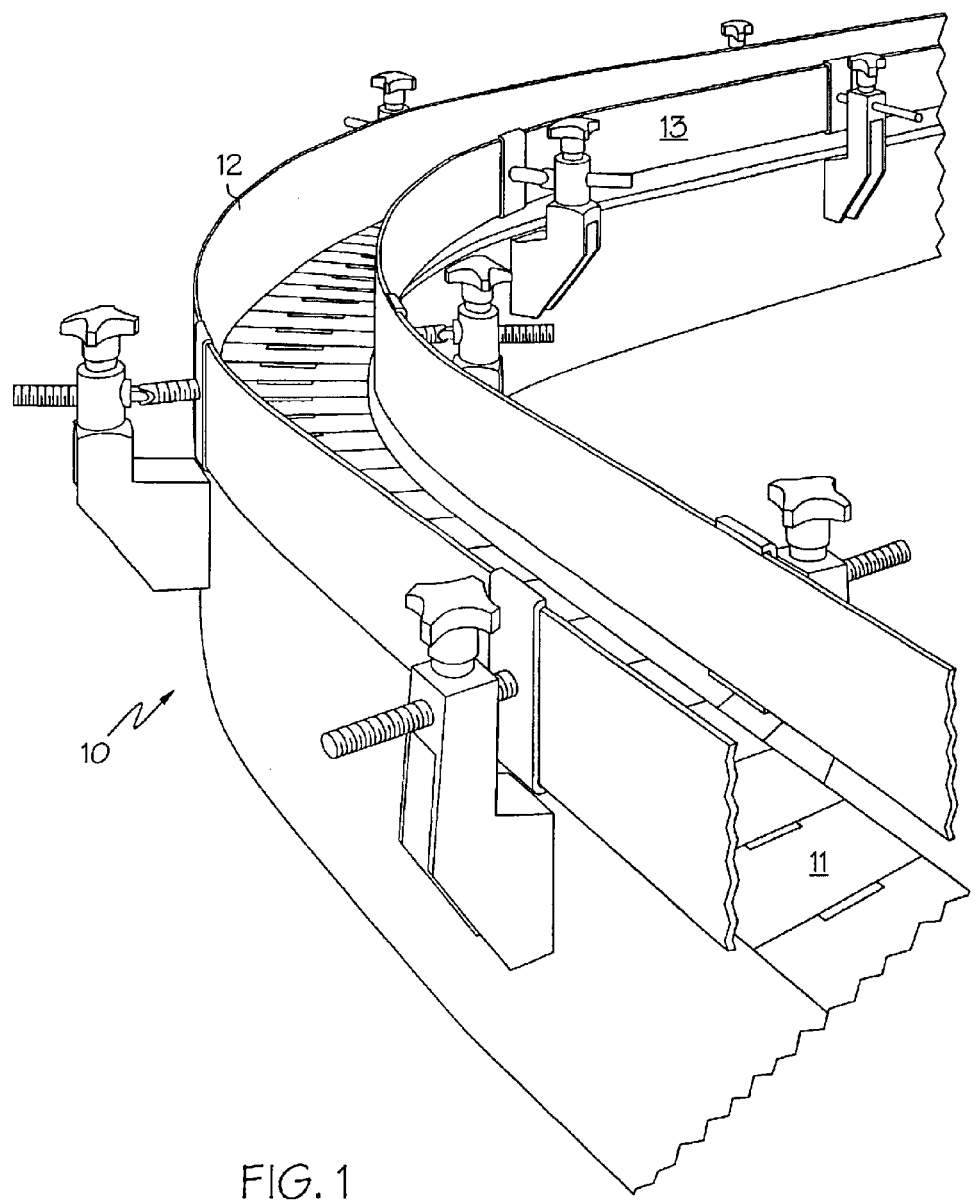
FIG. 1 is an environmental view of a set of guide rails of the invention used as a guide structure with a conveyor line.

With reference to FIG. 1, there is shown a conveyor line 10 with a continuous conveyor belt 11 and the article of manufacture of the invention serving as guide rails 12 and 13. Each guide rail is positioned on opposed sides of the conveyor belt 11 and further is bent to a curved shape to follow the edges of the conveyor belt. As should be apparent, items to be conveyed are kept on the conveyor belt by the guide rails 12 and 13.

Figure 3:
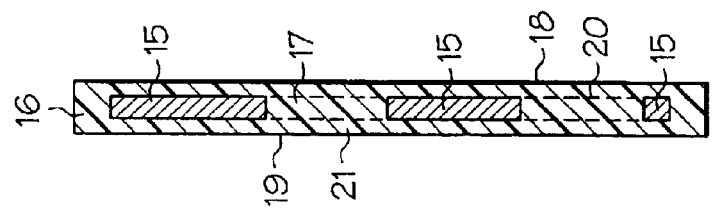
FIG. 3 is an end view in section of the guide rail of FIG. 2 taken along line 3—3 thereof.
Figure 2:
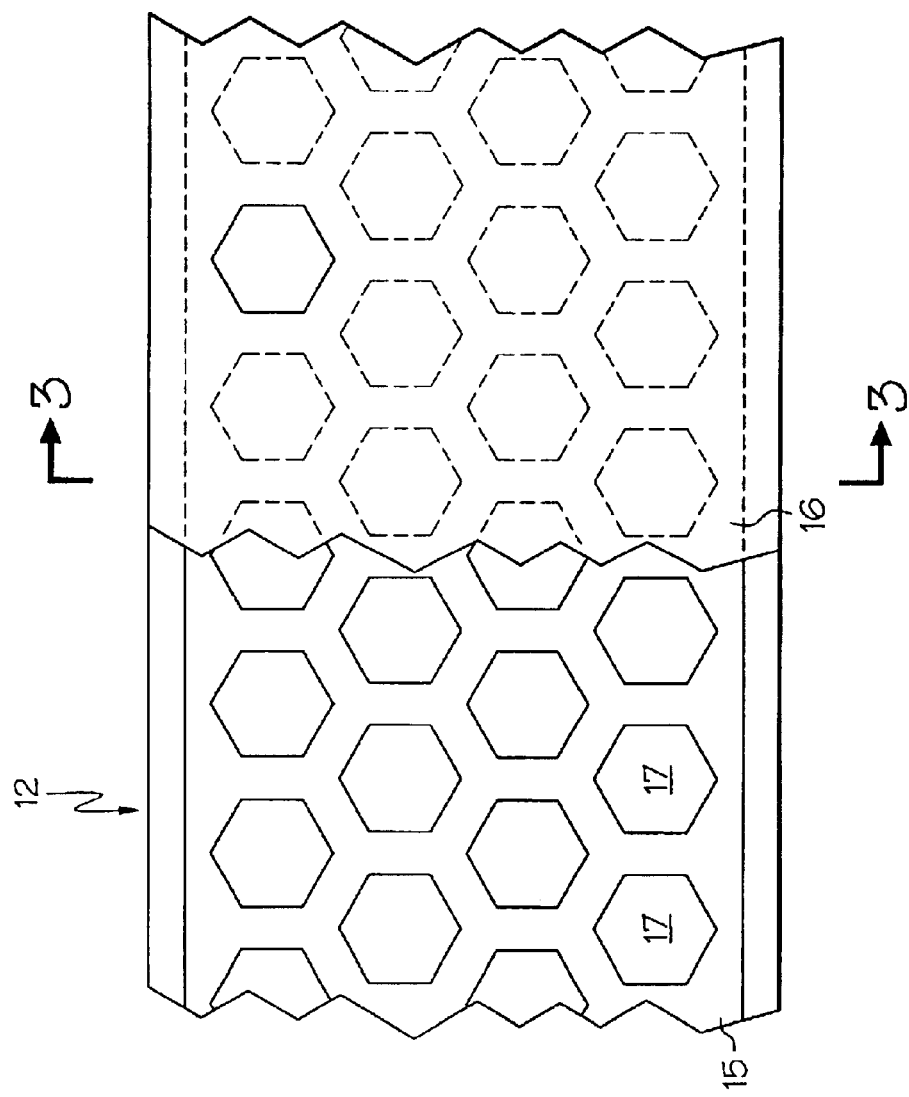
FIG. 2 is a side view in elevation showing a section of one of the guide rails of FIG. 1 with cladding on one side stripped away to a metal core having a honeycomb hole pattern.

As best seen in FIGS. 2 and 3, the guide rail 12 comprises a thin elongated malleable metal core 15 and an integral ultra high molecular weight (UHMW) polyethylene cladding system 16 encasing the metal core. The metal core 15 includes a spaced hole pattern of octagonal-shaped holes 17 throughout its length.

Still with reference to FIG. 3, the metal core 15 has a substantially flat front face 18 and an opposed substantially flat back face 19. The metal core itself is preferably fabricated from steel. Stainless steel can be used, especially when any part of the metal core is exposed to a hostile environment which could cause corrosion. Generally, the thickness of the metal core ranges from about 10 mils to about 250 mils, preferably from about 50 mils to about 200 mils. The metal core's thickness and its particular hole pattern, further discussed below, are coordinated to provide a requisite degree of strength and formability needed for the guide rail 12.

The holes in the metal core extend from the substantially flat front face to the substantially flat back face and are spaced so as to extend substantially the full length of the metal core. They are spaced substantially uniformly throughout the metal. As evident in FIG. 3, the holes provide a means of connecting a first layer 20 of the UHMW polyethylene found on the flat front face with a second layer 21 of the UHMW polyethylene found on the flat back face 19 to create the integral cladding system. The degree of formability, particularly bendability and direction of bendability of the article of manufacture is determinative of the hole density and placement. Typically, holes are created in the metal core in a conventional manner, e.g. stamping or laser cutting.

The guide rail's metal core of FIGS. 2 and 3 has a honey-combed hole pattern wherein the holes 17 are octagonal-shaped. The holes have a major axis cross-dimension of from about one-quarter inch to about one inch. Further, each hole is off-set and equi-distance from adjacent holes. As evident, there is no finite vertical area strip without a hole interruption. The resultant hole pattern is particularly useful in the guide rail article of manufacture in that it is conducive to the metal core being formed to have virtually any variable-line travel path. That is, the article of manufacture can be straight, curved left along its length, curved right along its length, and in fact curved a multiplicity of times, including different degrees of curves. The hole pattern is responsible for a very secure cladding/metal core strength unlikely to delaminate under normal contemplated uses and capable of withstanding normally encountered force stresses.

The metal core's height when used as a guide rail can vary widely, generally from about one-half inch to about twelve inches. Its length is dependent only on limitations imposed by equipment and shipping restrictions. Typically, lengths of at least about four inches are used, with a length of about ten inches to about one hundred inches preferred for reasons of practicality.

The UHMW polyethylene used to form the cladding system 16 is commercially available. It is particularly useful in the invention because of its ability to flow around the metal core and harden to a cladding which is firmly secured to the metal core. There is no need for conventional attaching means such as bolts/nuts, rivets, adhesives, etc. to hold the cladding system to the metal core. Further, it provides a desired set of physical characteristics needed in the conveyor line industry. The UHMW polyethylene typically is available in powder, flake or pellet form. It is a thermoplastic material and is readily used in conventional plastic molding processes. In particular, the UHMW polyethylene of interest has an average molecular weight of from about 3 million to about 6 million. The thickness of the cladding system on each side of the metal core varies widely, though generally a thickness of at least about 30 mils is acceptable. Preferably, for guide rail usage, the thickness of the UHMW polyethylene on each of the front face and the back face of the metal core is from about 50 mils to about 150 mils.

Figure 4:
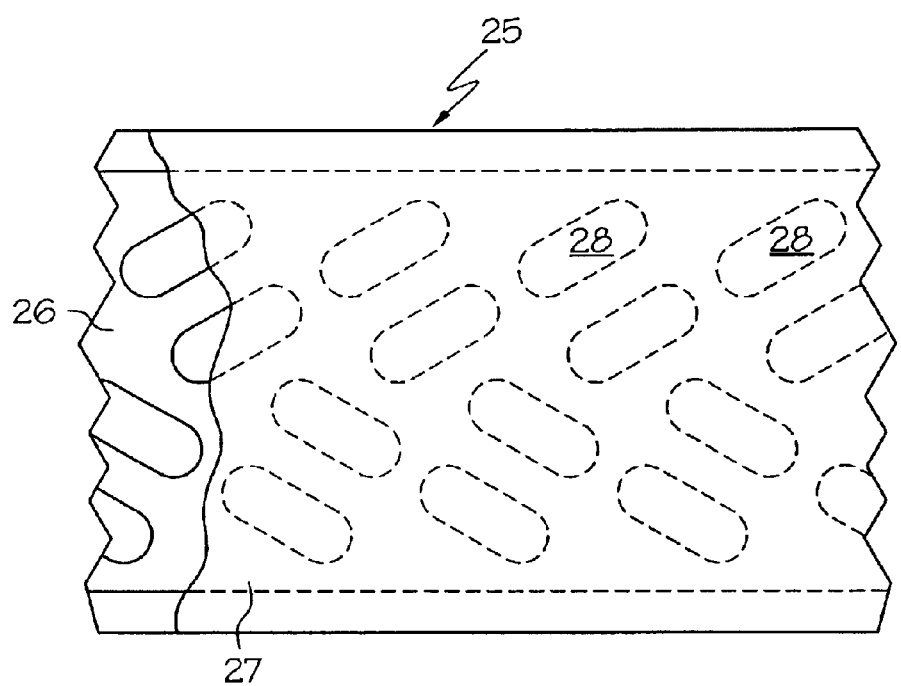
FIG. 4 is a side view in elevation showing another guide rail of the invention with cladding on one side partially stripped away to show a metal core having a herringbone hole pattern.
Figure 5:
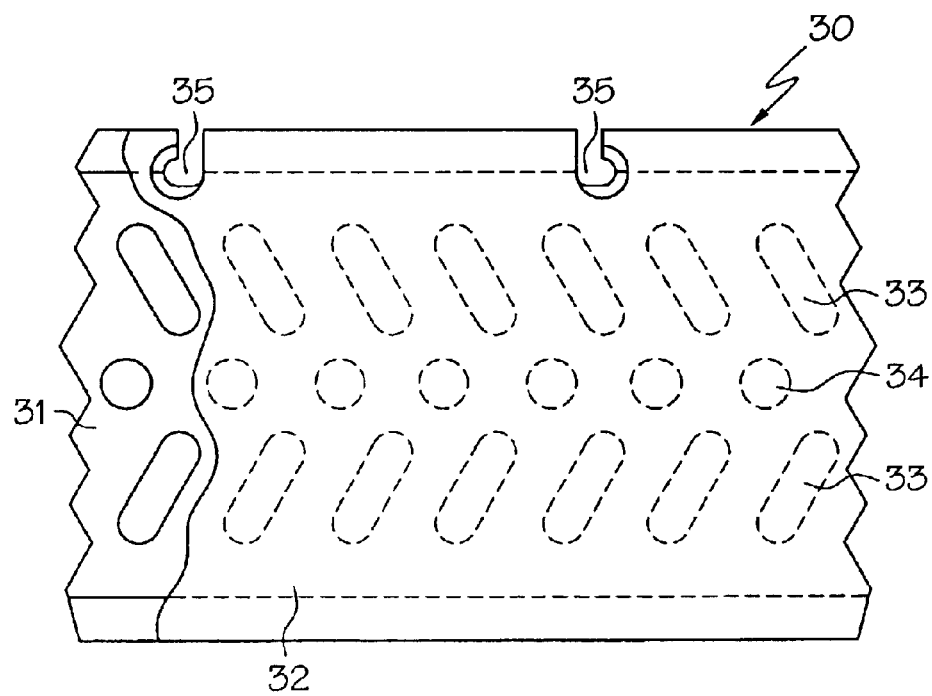
FIG. 5 is a side view in elevation showing still another guide rail of the invention with cladding on one side partially stripped away to show a metal core having outer rows of angled oval-shaped holes and a center row of round holes.

FIGS. 4 and 5 illustrate articles of manufacture of the invention having metal cores with particular hole patterns conducive to different end uses. Thus, with reference to FIG. 4, the article of manufacture 25 has a metal core 26 and a UHMW polyethylene cladding system 27. A set of holes 28 are spaced substantially uniformly along the metal core's length. The holes 28 are each elongated with rounded ends. They have a minor cross dimension of from about one-quarter inch to about one inch and a major cross dimension of from about one-half inch to about four inches. The holes are positioned in the metal core to provide a herringbone pattern. It is theorized that the herringbone pattern of holes result in lower stresses to the UHMW polyethylene cladding system with either constant or intermittent loads.

Figure 9:
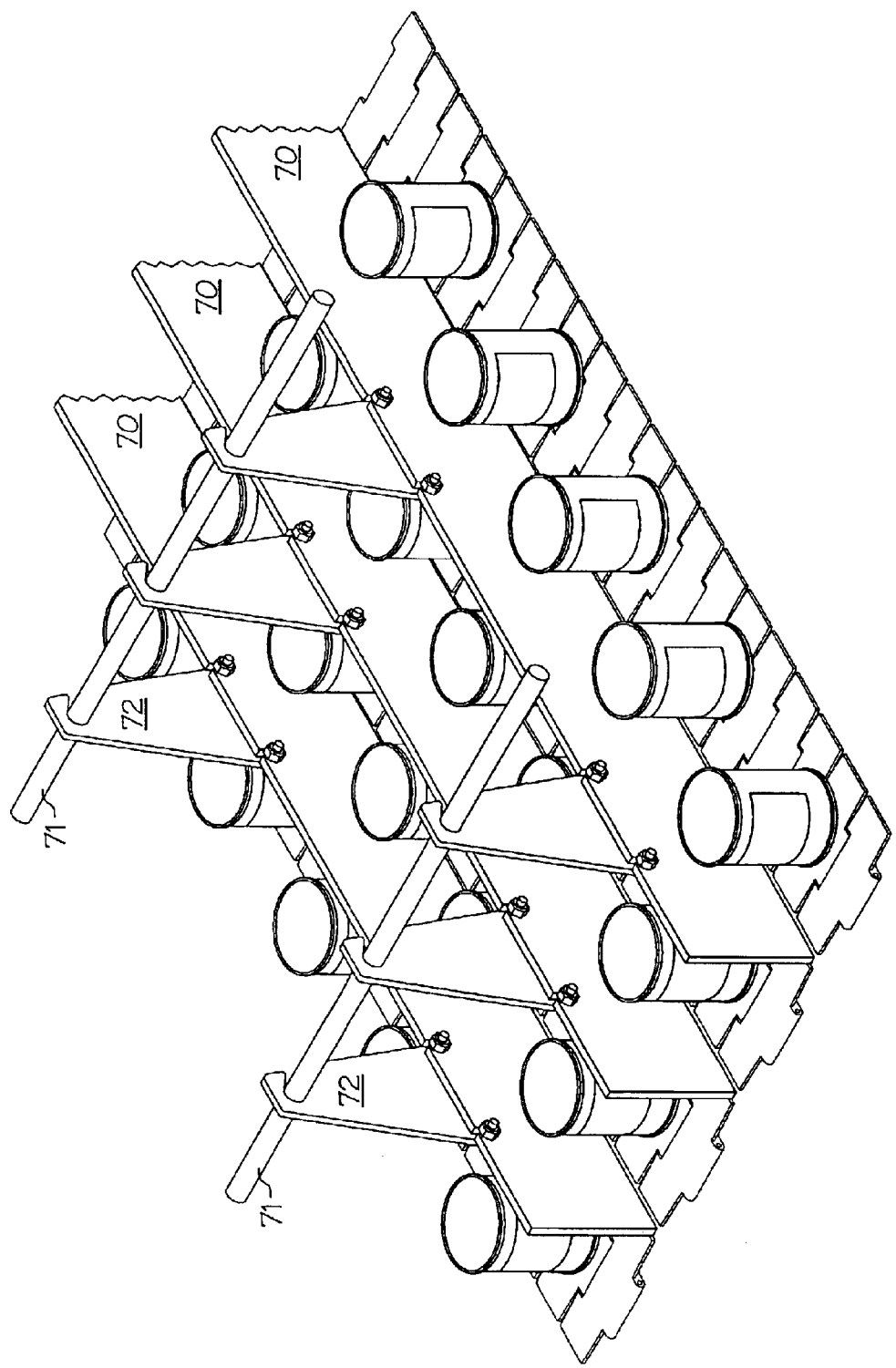
FIG. 9 is a perspective view of a conveyor line wherein multi-lane divider guide structures of the invention are depicted.

With respect to FIG. 5, there is shown an article of manufacture 30. The article has a metal core 31 and a UHMW polyethylene cladding system 32 covering both faces of the metal core. There are three rows of holes. Holes 33 in a first outer row and a second outer row are all oval-shaped and positioned at an angle. These holes have a minor cross dimension of about one-fourth inch to about one inch and a major cross dimension of about one-half inch to about four inches. Holes 34 in a center row are round with a diameter of from about one-fourth inch to about one inch. Exposed holes 35 spaced along the top of article and extending to the top edge are used together with bolts and nuts to hold the article in position, as seen in FIG. 9.

Figure 6:
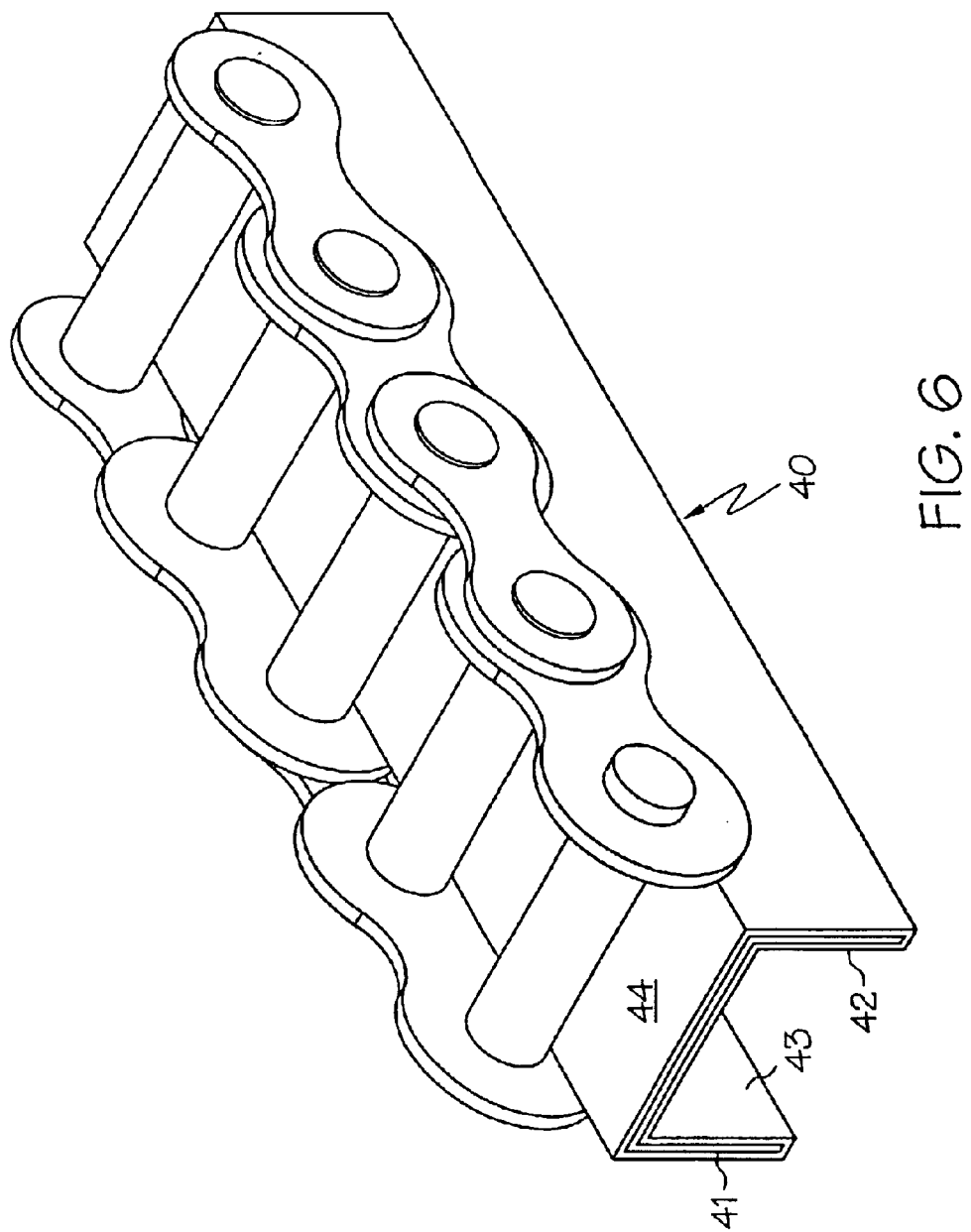
FIG. 6 is a perspective view of a guide structure of the invention formed as a chain guide.
Figure 7:
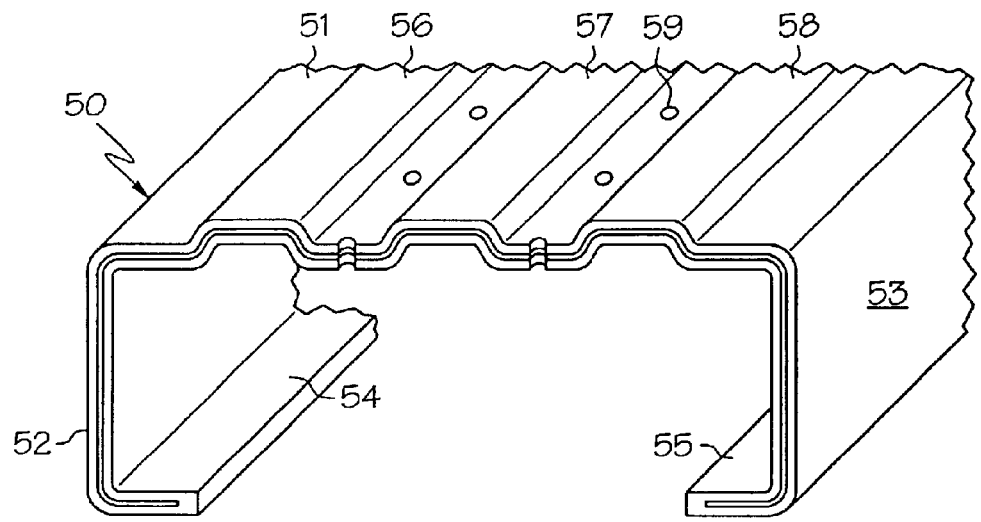
FIG. 7 is a perspective view of a guide structure of the invention used as a conveyor bed.
Figure 8:
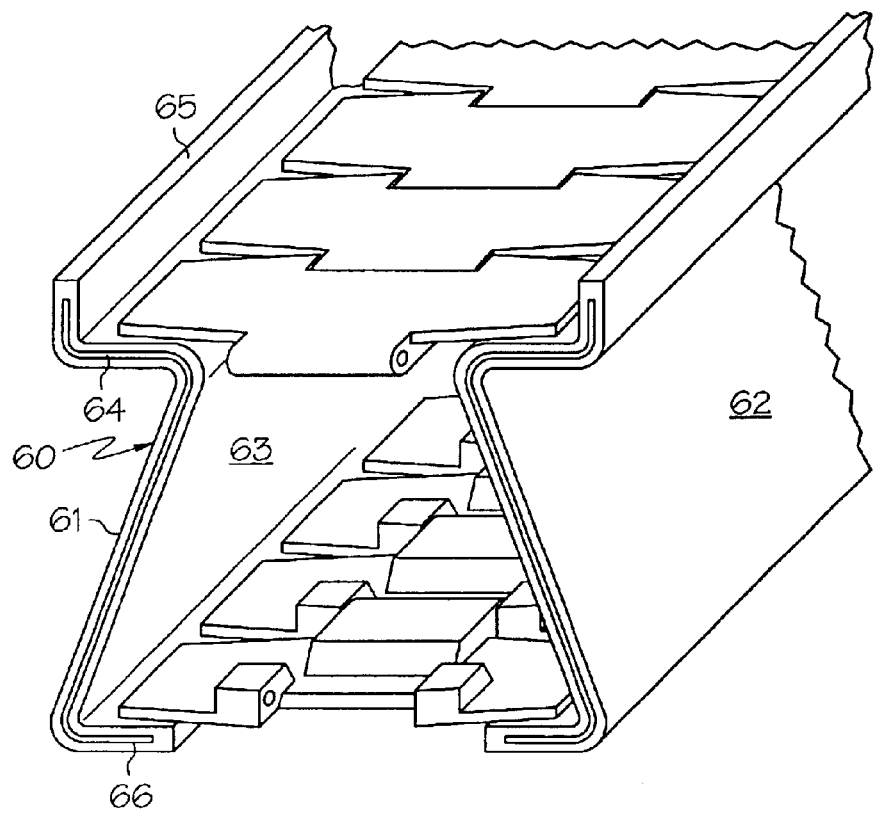
FIG. 8 is a perspective view of a guide structure of the invention used as a combination conveyor bed and conveyor belt guide.

Articles of manufacture of the invention formed into various guide structures are illustrated in FIGS. 6–8. FIG. 6 illustrates a chain guide, FIG. 7 illustrates a conveyor bed and FIG. 8 illustrates a combination conveyor bed/conveyor belt guide. All are formed from a metal core having a honey-combed hole pattern and a UHMW polyethylene cladding system as shown in FIGS. 2 and 3.

FIG. 6 illustrates a chain guide 40 formed in an open-top channel shape. As evident, a metal core 41 is bent near each of its two longitudinal edges to form two vertical walls 42 and 43 extending at substantially right angles to a central wall 44. The bends are positioned to extend along a row of holes in the metal core 41 extending throughout its length, thereby facilitating the bending. The cladding system 45 encasing the metal core readily bends with the metal core without delamination.

FIG. 7 depicts a conveyor bed 50 of the invention. It has the metal core having the spaced hole pattern and the UHMW cladding system. However, it is formed to create a substantially flat horizontal surface 51 with downwardly extending substantially vertical legs 52 and 53 and inwardly extending substantially horizontal legs 54 and 55. The surface 51 further has formed ridges 56–58 to accommodate a conveyor belt. The metal core in the conveyor bed extends throughout its width and length. Rows of holes spaced along its length where the bends are made to create the various legs facilitate the bending. The conveyor bed 50 is particularly useful because of its single piece construction, easy cleaning, bacteria-free construction as well as the bed's durability. While optional, drip holes 59 in the flat horizontal surface 51 prevent liquids from accumulating on the conveyor bed.

FIG. 8 illustrates a combination conveyor bed/belt guide 60. The conveyor bed/belt guide 60 is comprised of two formed guide structures 61 and 62. The two structures are mirror images of one another. Each is elongated with a central straight leg 63 angled inwardly, an upper leg 64 extending outwardly and substantially horizontally from the central leg 63, a substantially vertically extending leg 65 from a terminus of the upper leg 64 and a lower leg 66 extending substantially horizontally from a lower terminus of the central leg 63. Here also, the bends are made along rows of holes in the metal core. The upper legs 64 of the two guide structures 61 and 62 when positioned side by side form a ledge serving as a conveyor bed while the lower legs 66 serve as a return conveyor bed. The central legs help guide the conveyor belt.

FIG. 9 depicts a conveyor line with articles of manufacture of the invention serving as multi-lane dividers 70. Each of the dividers 70 has a metal core with a hole pattern and a UHMW cladding system and is formed from the article of manufacture depicted in FIG. 5. The dividers are substantially straight. Each of the dividers 70 is held in place above the conveyor line by support rods 71 and hangers 72. The hangers 72 are held at a lower end by bolts and nuts to the dividers and at an upper end by a hook-like slot to the rod. While not shown, it should be understood the dividers and hangers could be formed as a one-piece structure to eliminate the need for the bolts and nuts.

As evident from the drawings and above description, the articles of manufacture are unitary structures which are free of attaching means. These two features greatly enhance the use of the articles in that potentially interfering structures such as bolt heads and nuts are not present.

The above described articles of manufacture are all durable and formable to any needed variable-line of travel. Forming can occur by bending, rolling, or any other conventional metal forming method. The articles of manufacture further are all characterized in having surfaces with high wear resistance, low friction and are substantially noise-free in operation. Plastic creep is further inhibited due to the metal core. These characteristics make the article of the invention particularly useful as component parts in a conveyor line. It is eminently suited for the guide rails and lane dividers which require a tall, thin and elongated structure which can be bent to create gentle curves to guide a line of articles in a conveyor system. Other uses where similar characteristics are needed exist and such uses are contemplated.

While not illustrated, it should be apparent that enhanced strength can be obtained by securing two or more of similarly sized articles of manufacture together to create a laminar effect. Such enhanced strength may be needed in certain heavy duty conveyor lines.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. An article of manufacture for a conveyor line with minimal surface friction, said article of manufacture comprising:

a. a thin elongated metal core with a substantially flat front face and an opposing substantially flat back face, said metal core further having a spaced hole pattern extending substantially the full length thereof, for aiding in bending of the metal core, wherein each hole in the hole pattern extends from the front face to the opposed back face of the metal core and the holes are substantially uniformly spaced; and b. an integral UHMW polyethylene cladding system attached to the front face and the back face of the metal core, said cladding system (i) substantially covering the full front face of the metal core, (ii) substantially covering the full back face of the metal core and (iii) extending fully through each hole in the spaced hole pattern for filling each said hole in a connecting manner and for forming the integral cladding system, whereby the metal core provides sufficient strength to the article of manufacture to withstand shearing forces and further whereby the integral cladding system provides a surface along which items can move with minimal travel friction.

2. The article of manufacture of claim 1 wherein the metal core has a thickness of from about 10 mils to about 250 mils.

3. The article of manufacture of claim 2 wherein the metal core has a height of from about one-half inch to about twelve inches.

4. The article of manufacture of claim 3 wherein the metal core has a length of at least about four inches.

5. The article of manufacture of claim 2 wherein the metal core is bendable throughout its length to provide a curved travel path.

6. The article of manufacture of claim 2 wherein the holes in the metal core have a major axis cross dimension of from about one-fourth inch to about one inch.

7. The article of manufacture of claim 6 wherein each hole in the metal core is octagonal-shaped.

8. The article of manufacture of claim 6 wherein the holes in the metal core are oval-shaped and arranged in a herringbone pattern.

9. The article of manufacture of claim 2 wherein the holes in the metal core have a minor cross dimension of from about one-quarter inch to about one inch and a major cross dimension of from about one-half inch to about four inches.

10. The article of manufacture of claim 6 wherein the holes in the metal core are oval-shaped and arranged in an alternating bi-directional pattern.

11. The article of manufacture of claim 1 wherein the UHMW polyethylene has an average molecular weight of from about 3 million to about 6 million.

12. The article of manufacture of claim 1 wherein the cladding system on each of the front face and the back face of the metal core has a thickness of at least about 30 mils.

13. The article of manufacture of claim 12 wherein the cladding system on each of the front face and the back face of the metal core has a thickness of from about 50 mils to about 150 mils.

14. The article of manufacture of claim 1 wherein the cladding system encompasses the metal core.

15. An article of manufacture for a conveyor line to direct items along a durable variable-line travel path with minimal travel friction, said article of manufacture comprising:

a. a thin elongated malleable metal core having a thickness of from about 10 mils to about 250 mils with a substantially flat front face and an opposing substantially flat back face, said metal core further having a spaced hole pattern extending substantially the full length thereof wherein each hole in the hole pattern is octagonal-shaped and extends from the front face to the opposed back face of the metal core and the octagonal-shaped holes are substantially uniformly spaced such that no finite vertical area strip exists without a hole interruption; and b. an integral UHMW polyethylene cladding system attached to the front face and the back face of the metal core, said cladding system having a first layer with a thickness of from about 50 mils to about 150 mils to substantially cover the full front face of the metal core and having a second layer with a thickness of from about 50 mils to about 150 mils to substantially cover the full back face of the metal core and connected together through the holes in the spaced hole pattern to form the integral cladding system, whereby the malleable metal core provides sufficient strength to the article of manufacture to withstand forces to conform the article of manufacture to a curving travel path and to withstand shearing forces from the items moving in the travel path and further whereby the integral cladding system provides a surface along which the items can move with the minimal travel friction.

16. The article of manufacture of claim 15 wherein the metal core has a thickness of from about 50 mils to about 200 mils.

17. An article of manufacture for a conveyor line to direct items along a travel path with minimal travel friction, said article of manufacture comprising:

a. a thin elongated malleable metal core with a substantially flat front face and an opposing substantially flat back face, said metal core further having a spaced hole pattern extending substantially the full length thereof, for aiding in bending of the metal core, wherein each hole in the hole pattern extends from the front face to the opposed back face of the metal core and the holes are substantially uniformly spaced; and b. an integral UHMW polyethylene cladding system attached to the front face and the back face of the metal core, said cladding system having a first layer to substantially cover the front face of the metal core and having a second layer to substantially cover the back face of the metal core and further the first layer and the second layer extend into each of the holes of the metal core to meet one another so as to fully fill said holes for connecting together the first layer and the second layer of the integral cladding system, whereby the malleable metal core provides sufficient strength to the article of manufacture to withstand forces to conform the article of manufacture to a travel path and to withstand shearing forces from the items moving in the travel path and further whereby the integral cladding system provides a surface along which the items can move with the minimal travel friction.

18. The article of manufacture of claim 17 wherein the metal core has a thickness of from about 50 mils to about 200 mils.

19. The article of manufacture of claim 18 wherein the first layer of the cladding system on the front face of the metal core has a thickness of at least about 30 mils and the second layer of the cladding system on the back face of the metal core has a thickness of at least about 30 mils.

20. The article of manufacture of claim 19 wherein the first and second layers of the cladding system each has a thickness of from about 50 mils to about 150 mils.

* * * * *